(12) United States Patent
Mitsuoka et al.

(10) Patent No.: US 11,046,126 B2
(45) Date of Patent: Jun. 29, 2021

(54) PNEUMATIC TIRE AND METHOD FOR MANUFACTURING THE SAME

(71) Applicant: Sumitomo Rubber Industries, Ltd., Kobe (JP)

(72) Inventors: Masanori Mitsuoka, Kobe (JP); Yoshiaki Kanematsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 461 days.

(21) Appl. No.: 15/916,444

(22) Filed: Mar. 9, 2018

(65) Prior Publication Data
US 2018/0264897 A1 Sep. 20, 2018

(30) Foreign Application Priority Data

Mar. 16, 2017 (JP) .............................. JP2017-051637

(51) Int. Cl.
*B60C 19/08* (2006.01)
*B29D 30/60* (2006.01)
*B29D 30/52* (2006.01)

(52) U.S. Cl.
CPC ............ *B60C 19/082* (2013.01); *B29D 30/52* (2013.01); *B29D 30/60* (2013.01); *B29D 2030/526* (2013.01)

(58) Field of Classification Search
CPC ....... B60C 19/082; B60C 19/08; B60C 11/03; B60C 2011/0358; B60C 11/11; B60C 19/00; B29D 2030/526
See application file for complete search history.

(56) References Cited

U.S. PATENT DOCUMENTS

2013/0092301 A1\* 4/2013 Ebiko ................. B60C 11/1323
152/209.15
2014/0166169 A1\* 6/2014 Tanaka ................ B60C 11/1376
152/209.15

(Continued)

FOREIGN PATENT DOCUMENTS

EP 2572902 A1 3/2013
EP 2837511 A1 2/2015

(Continued)

OTHER PUBLICATIONS

Extended European Search Report, dated Jul. 24, 2018, for European Application No. 18159300.5.

*Primary Examiner* — Steven D Maki
*Assistant Examiner* — Cedrick S Williams
(74) *Attorney, Agent, or Firm* — Birch, Stewart, Kolasch & Birch, LLP

(57) ABSTRACT

A pneumatic tire includes a tread portion including main grooves and land portions. In a cross-sectional view of the tire, one of the land portions includes a first edge, a second edge, a ground contact surface extending between the first edge and the second edge and having an arc-shaped profile protruding radially outwardly, and conductive portion made of conductive rubber. The conductive portion extends from a radially inner end to a radially outer end exposed at the ground contact surface with an inclination toward the first edge. The inner end is connected to a tire internal structural member to be electrically connected to a rim when the tire is mounted on the rim. On the ground contact surface, a central position of the outer end is located on a central position of the land portion in a tire axial direction, or on a side of the first edge.

12 Claims, 10 Drawing Sheets

(56) References Cited

U.S. PATENT DOCUMENTS

2017/0334250 A1\* 11/2017 Mukai ................. B60C 11/1392
2018/0194171 A1\* 7/2018 Suzuki .................... B60C 11/03

FOREIGN PATENT DOCUMENTS

| JP | 2010-115935 A | 5/2010 |
| JP | 2013-184551 A | 9/2013 |

\* cited by examiner

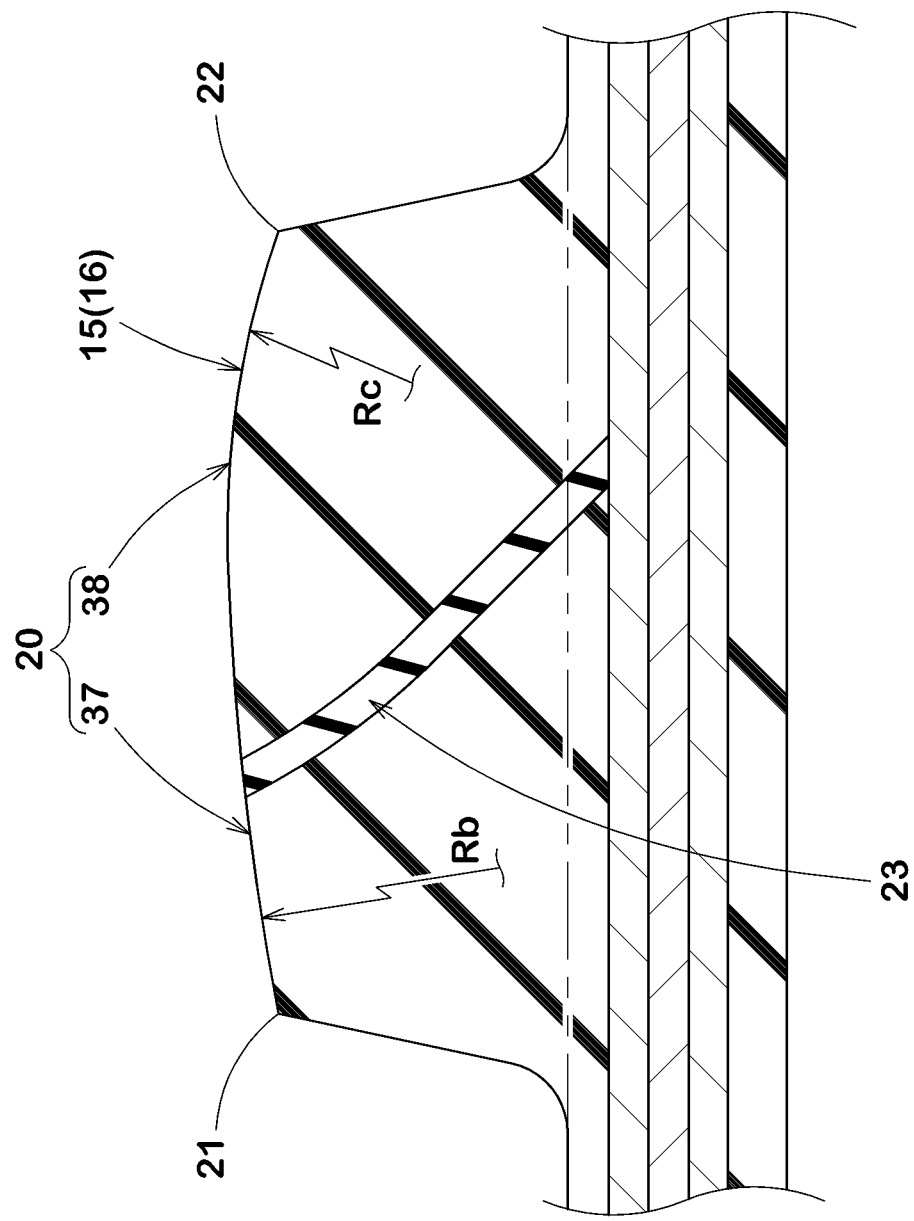

PNEUMATIC TIRE AND METHOD FOR MANUFACTURING THE SAME

BACKGROUND ART

Field of the Invention

The present disclosure relates to a pneumatic tire having a conductive portion for discharging static electricity and a method for manufacturing the same.

Description of the Related Art

Recent years, tire treads with silica-rich rubber have been proposed. Since such tire treads show high electric resistance, static electricity tends to be accumulated in vehicle bodies. For example, Japanese Unexamined Patent Application Publication 2010-115935 discloses a pneumatic tire having a conductive portion for discharging static electricity to the ground. The conductive portion, for example, extends radially outwardly from an inner end to an outer end with an inclination, wherein the outer end is exposed at a ground contact surface of a tread land portion and wherein the inner end is connected to a tire internal structural member to be electricity connected to a rim when the tire is mounted on the rim.

Upon vulcanizing a raw tire, a land portion of the tread rubber defined by a pair of main grooves tends to be being plasticized such that a central region thereof flows axially outwardly toward the pair of main grooves. Thus, an inclined conductive portion between the pair of main grooves, upon vulcanizing, tends to be deformed such that a radially outer end of the conductive portion is pulled toward one of the pair of main grooves, resulting in making an angle between the conductive portion and the ground contact surface smaller, i.e., the angle sharpening. Unfortunately, the tire described above has a problem that rubber separation tends to occur from the outer end exposed at the ground contact surface.

SUMMARY OF THE INVENTION

The present disclosure has been made in view of the above circumstances and has an object to provide a pneumatic tire and a method for manufacturing the same capable of suppressing separation of a conductive portion.

According to one aspect of the disclosure, a pneumatic tire includes a tread portion including circumferentially and continuously extending main grooves and land portions divided by the main grooves. In a cross-sectional view of the tire including a tire axis, one of the land portions includes a first edge, a second edge, a ground contact surface extending between the first edge and the second edge and having an arc-shaped profile protruding radially outwardly, and conductive portion made of conductive rubber. The conductive portion extends from a radially inner end to a radially outer end exposed at the ground contact surface with an inclination toward the first edge, wherein the inner end is connected to a tire internal structural member to be electrically connected to a rim when the tire is mounted on the rim, and on the ground contact surface, a central position of the outer end is located on a central position of said one of the land portions in a tire axial direction, or on a side of the first edge with respect to the central position of one of the land portions.

In another aspect of the disclosure, the ground contact surface has a radially maximum height (h1) from a straight line connecting the first edge and the second edge, and the maximum height (h1) may be in a range of from 0.4% to 0.8% of an axial width (W1) of the ground contact surface.

In another aspect of the disclosure, the profile of the ground contact surface may have a radius of curvature in a range of from 350 to 750 mm.

In another aspect of the disclosure, an axial distance from the first edge to the outer end may be in a range of from 0.40 to 0.80 times a depth of one of the main grooves which adjoins the first edge.

In another aspect of the disclosure, the tire internal structural member may include a belt layer disposed in the tread portion and extending along an outer surface of the tread portion.

In another aspect of the disclosure, an acute angle between the conductive portion and the belt layer may be smaller than an acute angle between the conductive portion and the ground contact surface.

In another aspect of the disclosure, the conductive portion may be inclined at an angle of from 40 to 60 degrees with respect to the ground contact surface.

In another aspect of the disclosure, said one of the land portions may be provided with a first lateral groove extending from the first edge and terminating within said one of the land portions and a second lateral groove extending from the second edge and terminating within said one of the land portions.

In another aspect of the disclosure, the first lateral groove may have groove void volume smaller than that of the second lateral groove.

In another aspect of the disclosure, the first lateral groove and the second lateral groove may be inclined with respect to the tire axial direction.

In another aspect of the disclosure, a maximum angle of the first lateral groove with respect to the tire axial direction may be smaller than a maximum angle of the second lateral groove with respect to the tire axial direction.

In another aspect of the disclosure, a maximum groove width of the first lateral groove may be greater than a maximum groove width of the second lateral groove.

In another aspect of the disclosure, the first lateral groove and the second lateral groove may have first inner end and a second inner end, respectively, each terminating within said one of the land portions.

In another aspect of the disclosure, a groove wall of the first inner end may be inclined at a smaller angle with respect to a tire radial direction than that of a groove wall of the second inner end.

In another aspect of the disclosure, the profile of the ground contact surface may include a first profile on a side of the first edge and a second profile on a side of the second edge, and a radius of curvature of the first profile may be greater than that of the second profile.

In another aspect of the disclosure, a method for manufacturing a pneumatic tire, the method includes: forming a raw tire including a tread portion provided with a conductive portion made of a conductive rubber, wherein the conductive portion of the raw tire extends radially outwardly to an outer end exposed at a ground contact surface of the tread portion with an inclination toward a first side in a tire axial direction; and vulcanizing the raw tire using a tire mold having a pair of protrusions for molding main grooves to mold a land portion of the tread portion between the pair of protrusions such that the land portion includes the conductive portion therein, wherein the tire mold includes a ground contact surface molding face for molding a ground contact surface of the land portion between the pair of protrusions, and wherein the ground contact surface molding face is configured as an arc-shaped concave surface to produce rubber flow such that the outer end of the conductive portion, upon vulcanizing, is moved to a central side of the land portion in a tire axial direction.

In another aspect of the disclosure, a radius of curvature of the ground contact surface molding face may be in a range of from 350 to 750 mm.

BRIEF DESCRIPTION OF THE DRAWINGS

FIG. 7 is an enlarged view of a land portion in accordance with another embodiment of the disclosure.

DESCRIPTION OF THE PREFERRED EMBODIMENTS

Figure 1:
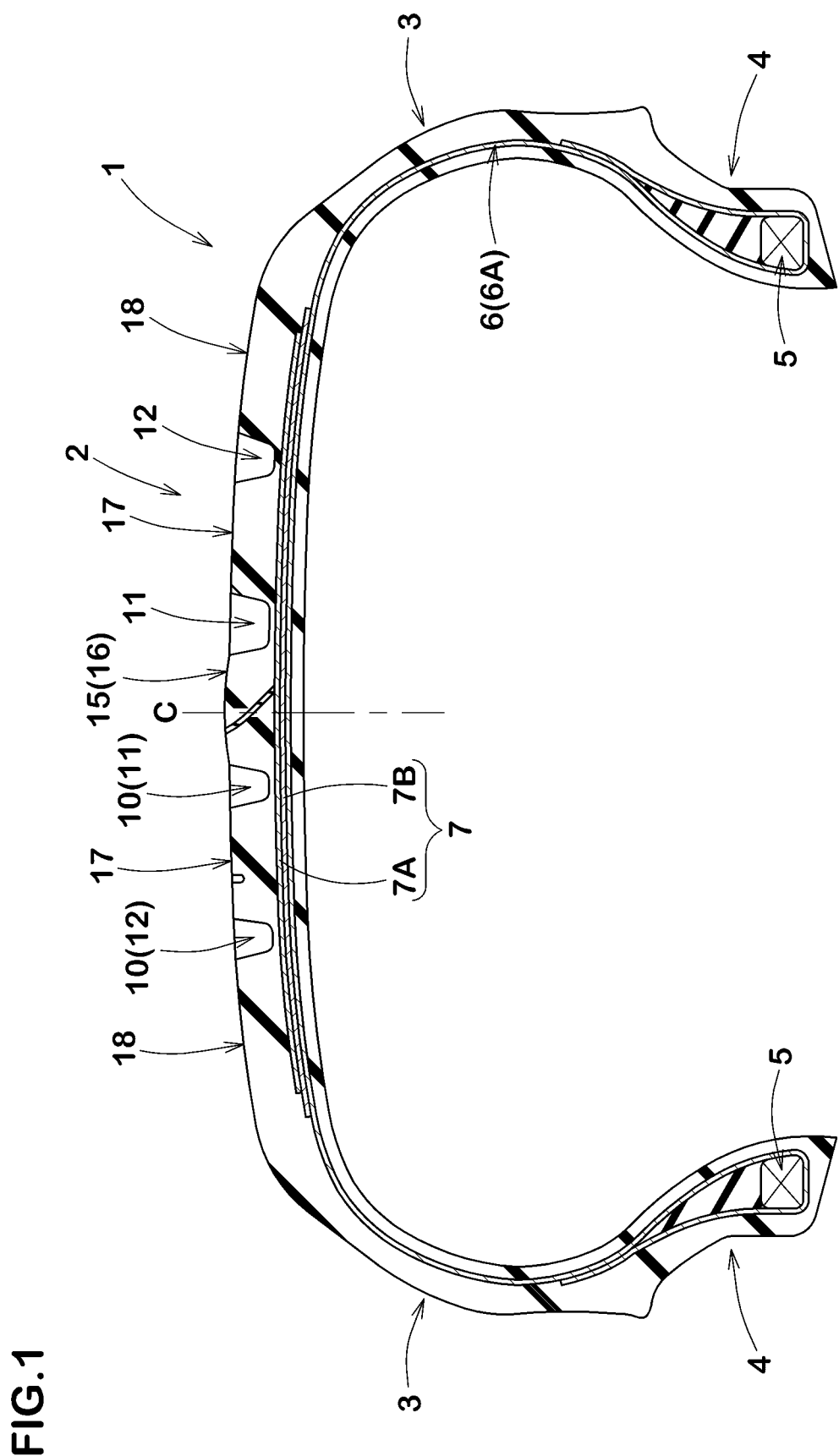
FIG. 1 is a cross-sectional view of a pneumatic tire according to an embodiment of the present disclosure.

An embodiment of the present invention will be explained below with reference to the accompanying drawings. FIG. 1 is a cross-sectional view including a tire axis of a pneumatic tire (hereinafter, simply referred to as "tire") 1 under a standard condition in accordance with an embodiment of the present disclosure.

The standard condition is such that the tire 1 is mounted on a standard wheel rim (not illustrated) with a standard pressure, but is loaded with no tire load. In this application including specification and claims, various dimensions, positions and the like of the tire 1 refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 in accordance with the present embodiment, for example, is suitably employed for passenger cars. The tire 1 in accordance with the present embodiment, for example, includes a carcass 6 extending between bead cores 5 of bead portions 4 through a tread portion 2 and a pair of sidewall portions 3. In this embodiment, the carcass 6, for example, is configured as one carcass ply 6A which includes parallelly arranged carcass cords coated with topping rubber. A belt layer 7 of belt cords is disposed radially outside the carcass 6 in the tread portion 2, for example. The belt layer 7 extends along an outer surface of the tread portion 2. The belt layer 7, for example, includes two belt plies 7A and 7B. In this embodiment, the carcass 6 and belt layer 7 constitutes a part of a tire internal structural member which is electrically connected to the wheel rim when the tire is mounted on the rim.

Figure 2:
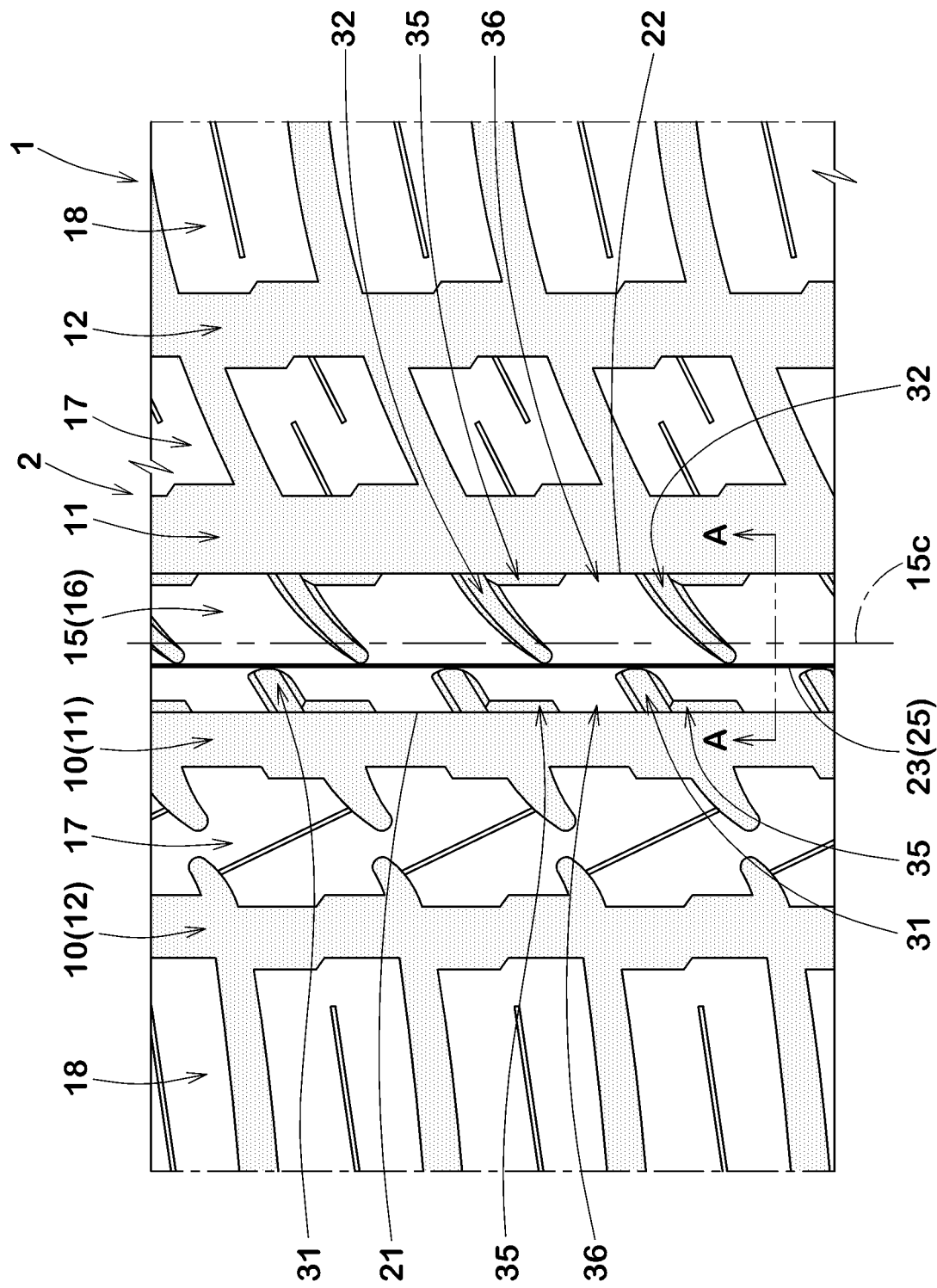
FIG. 2 is a development view of a tread portion of FIG. 1.

FIG. 2 illustrates a development view of the tread portion 2 of the tire 1 shown in FIG. 1. As illustrated in FIG. 2, the tread portion 2 includes circumferentially and continuously extending main grooves 10 and land portions 15 divided by the main grooves 10. The main grooves 10, for example, include a pair of crown main grooves 11 between which the tire equator C (shown in FIG. 1) is located, and a pair of shoulder main grooves 12 between which the pair of crown main grooves 11 are located. The land portions 15, for example, include a crown land portion 16 disposed on the tire equator C, a pair of middle land portions 17 each of which is between one crown main groove 11 and one shoulder main groove 12 on each side of the tire equator C, and a pair of shoulder land portions 18 each located axially outside the pair of shoulder main grooves 12.

Figure 3:
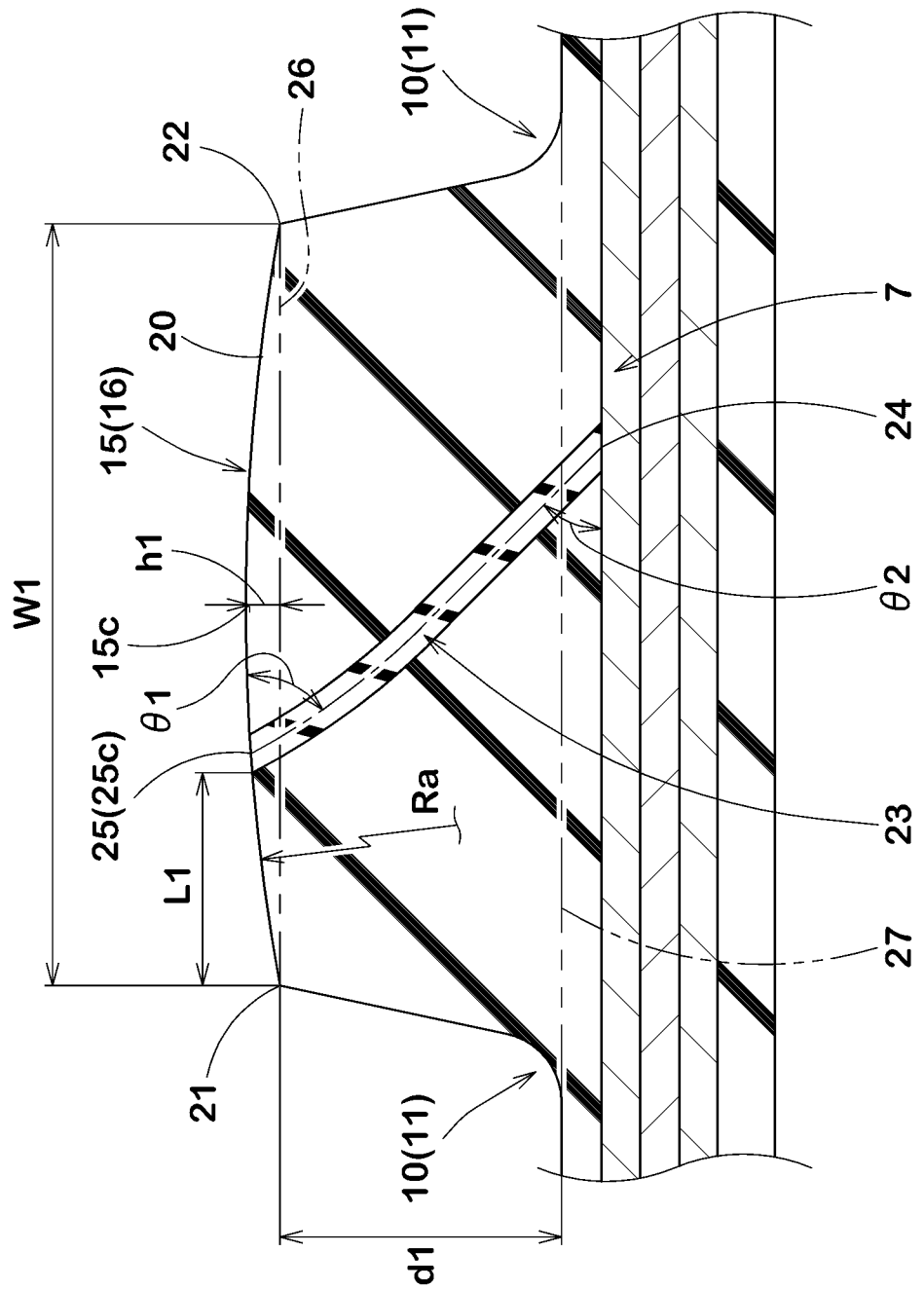
FIG. 3 is a cross-sectional view taken along line A-A of FIG. 2.

FIG. 3 illustrates an enlarged cross-sectional view of the crown land portion 16 as a representative of one of the land portions 15. As illustrated in FIG. 3, the land portion 15, in a cross-sectional view including the tire axis, includes a first edge 21, a second edge 22, a ground contact surface 20 extending between the first edge 21 and the second edge 22, and a conductive portion 23. In this embodiment, the crown land portion 16 is provided with the conductive portion 23. Alternatively, or additionally, the conductive portion 23 may be provided on the middle land portions 17 and/or the shoulder land portions 18.

The first edge 21 and the second edge 22 are defined as outermost ground contact positions of the land portion 15 in an axial direction of the land portion when the tire 1 grounded on a horizontal plane with a standard tire load at zero camber.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

The ground contact surface 20 has an arc-shaped profile that protrudes radially outwardly between the first edge 21 and the second edge 22.

The conductive portion 23 is made of conductive rubber. The conductive portion 23 has an electric resistance value such that static electricity accumulated in a vehicle body is discharged to the ground through from the tire internal structural member. Thus, the conductive rubber, for example, preferably has a volume resistivity value less than $1 \times 10^8$ ohm·cm. In this specification, the volume resistivity means a value measured with an ohm meter under the following conditions: applied voltage 500V, temperature 25 degrees C. and humidity 50%, using a specimen of 15 cm×15 cm×2 mm.

The conductive portion 23 includes a radially inner end 24 and a radially outer end 25. The inner end 24 is connected to the belt layer 7, for example. The outer end 25 is exposed at the ground contact surface 20. Further, the conductive portion 23 is inclined from the inner end 24 to the outer end 25 with an inclination toward the first edge 21. Furthermore, on the ground contact surface 20, a central position 25c of the outer end 25 is located on a central position 15c of the land portion 15 in the tire axial direction, or on a side of the first edge 21 with respect to the central position 15c of the land portion 15.

In case that the land portion 15 is vulcanized in such a manner that the ground contact surface 20 thereof has an arc-shaped manner protruding radially outwardly, there is a dominant tendency that plasticized rubber on a side of the ground contact surface 20 flows toward the central position 15c of the land portion 15. On the other hand, the conductive portion 23 is inclined toward the first edge 21 from the inner end 24 to the outer end 25, and the central position 25c of the outer end 25 is located on the central position 15c or on a side of the first edge 21 of the land portion 15. Such a conductive portion 23, upon vulcanizing, receives the above-mentioned rubber flow, resulting in maintaining a sufficient large angle between the ground contact surface 20 and the conductive portion 23. Thus, separation to be generated from the outer end 25 of the conductive portion can be suppressed.

In order to further improve the above effect, a radius Ra of curvature of the arc-shaped profile of the ground contact surface 20 is preferably equal to or more than 350 mm, more preferably equal to or more than 450 mm, but preferably equal to or less than 750 mm, more preferably equal to or less than 550 mm.

The ground contact surface 20 has a radially maximum height h1 from a straight line 26 connecting the first edge 21 and the second edge 22. In order for the ground contact surface 20 to wear uniformly while maintaining the above effect, the maximum height h1 is preferably equal to or more than 0.4%, more preferably equal to or more than 0.5%, but preferably equal to or less than 0.8%, more preferably equal to or less than 0.7% of an axial width W1 of the ground contact surface 20.

In the same point of view, a cross-sectional area Sa of the land portion 15 defined between the straight line 26 and the arc-shaped profile of the ground contact surface 20, for example, is preferably in a range of from 0.7% to 1.4% of a cross-sectional area St of the land portion 15, wherein the area St is an area of the land portion located radially outwardly of a groove bottom reference line 27. The groove bottom reference line 27 is defined as a straight line that connects bottoms of the main grooves 10 arranged on both sides of the land portion 15.

The conductive portion 23, for example, has a substantially constant width. The conductive portion 23 as such may exhibit excellent durability since it may be difficult to receive local damage even if the land portion 15 is subject to receive repeated deformation. Note that the conductive portion 23 is not limited to such an aspect, but has a varying width, for example.

Preferably, the conductive portion 23 is inclined at an acute angle θ1 in a range of from 40 to 60 degrees with respect to the ground contact surface 20 in order to further improve durability thereof.

Preferably, an acute angle θ2 between the conductive portion 23 and the belt layer 7 is smaller than the angle θ1 between the conductive portion 23 and the ground contact surface 20. Specifically, the angle θ2, for example, is preferably in a range of from 30 to 50 degrees. The conductive portion 23 as such may exhibit further improved durability.

In some preferred embodiment of the conductive portion 23, the angle of the conductive portion 23 with respect to the tire axial direction may increase gradually toward radially outwardly. This shape may be obtained vulcanizing a raw tire having straightly extending conductive portion 23 in such a way as to receive the above-mentioned rubber flow.

An axial distance L1 from the first edge 21 to the outer end 25 is preferably equal to or more than 0.40 times, more preferably equal to or more than 0.50 times a depth d1 of the main groove 10 which adjoins the first edge 21, and the distance L1 is also preferably equal to or less than 0.80 times, more preferably equal to or less than 0.70 times the depth d1, in order to exert excellent durability.

In some preferred embodiments, the distance L1 may be set equal to or more than 3.5 mm in order to exert excellent durability.

Figure 4:
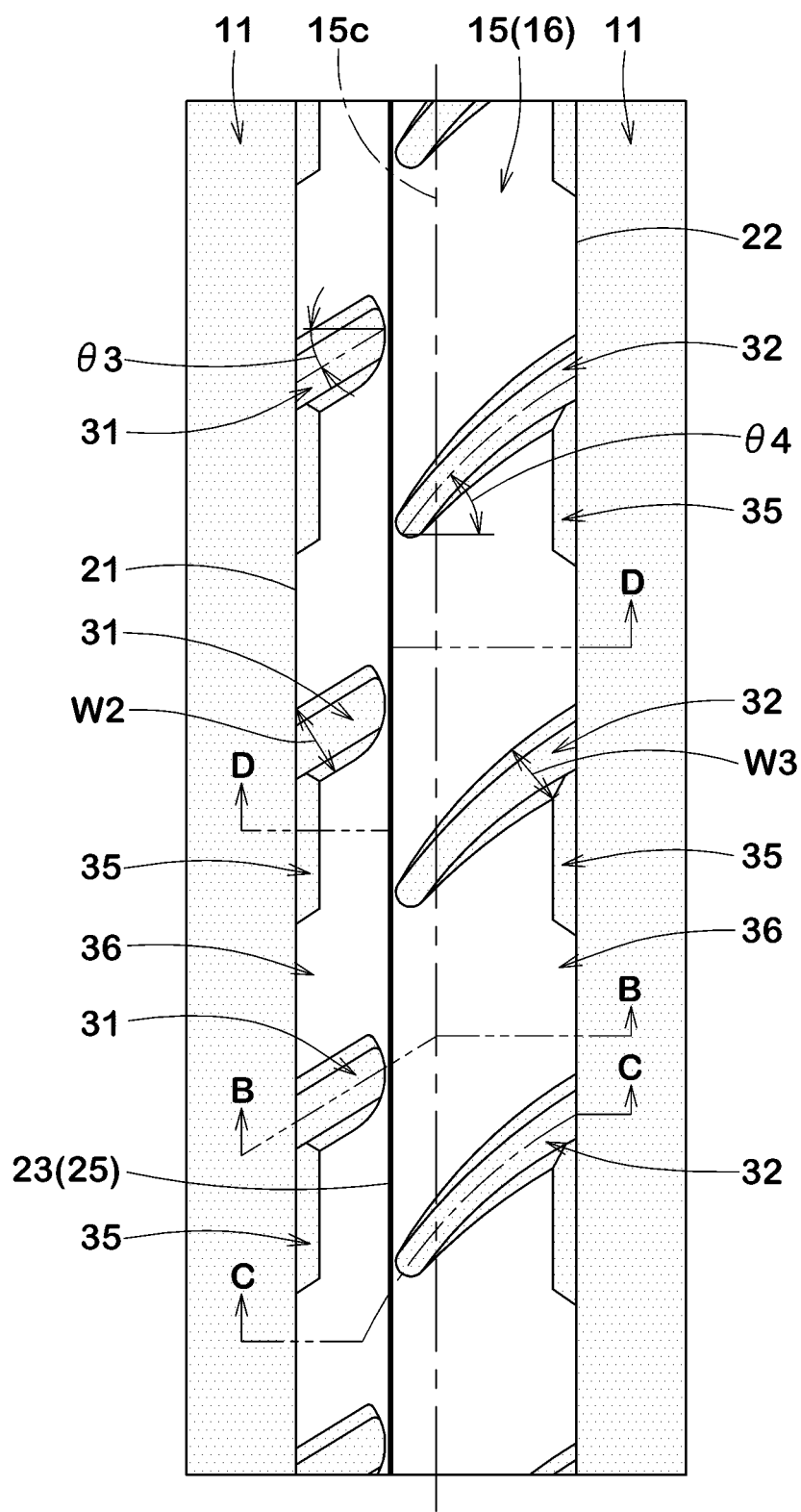
FIG. 4 is an enlarged view of a crown land portion.

FIG. 4 illustrates an enlarged view of the crown land portion 16. As illustrated in FIG. 4, the crown land portion 16 which is provide with the conductive portion 23, for example, is preferably configured as a rib which extends continuously in the tire circumferential direction. The outer end 25 of the conductive portion 23, for example, preferably extends continuously in a straight manner in the tire circumferential direction. The conductive portion 23 as such, upon running, can come into contact with the ground continuously, resulting in discharging static electricity effectively to the ground.

In this embodiment, the land portion 15 is provided with first lateral grooves 31 each extending from the first edge 21 and terminating within the land portion 15 and second lateral grooves 32 each extending from the second edge 22 and terminating within the land portion 15. The first lateral grooves 31 and the second lateral grooves 32 may improve wet performance while maintaining rigidity of the land portion 15.

Preferably, each of the first lateral grooves 31, for example, has groove void volume smaller than that of each of the second lateral grooves 32. In this embodiment, the first lateral grooves 31 extend from the first edge 21 and terminate without reaching the axial center position 15c of the land portion 15. The second lateral grooves 32 extend from the second edge 22 and terminate beyond the center position 15c, i.e. on the side of the first edge 21. Thus, deformation of a portion of the land portion 15 on a side of the first edge 21 may be reduced relatively, resulting in suppressing damage of the conductive portion 23 being inclined to the first edge 21.

The first lateral grooves 31 and the second lateral grooves 32, for example, are inclined at angles with respect to the tire axial direction. The maximum angle θ3 of the first lateral grooves 31 with respect to the tire axial direction is preferably smaller than the maximum angle θ4 of the second lateral grooves 32 with respect to the tire axial direction. This structure makes it possible to enlarge the angle θ1 of the conductive portion 23, leading to better durability of the conductive portion 25.

In the same point of view, the maximum groove width W2 of the first lateral grooves 31 is greater than the maximum groove width W3 of the second lateral grooves 32. Specifically, the maximum groove width W2 of the first lateral grooves 31, for example, may preferably be in a range of from 1.2 to 1.4 times the maximum groove width W3 of the second lateral groove 32.

Figure 5A:
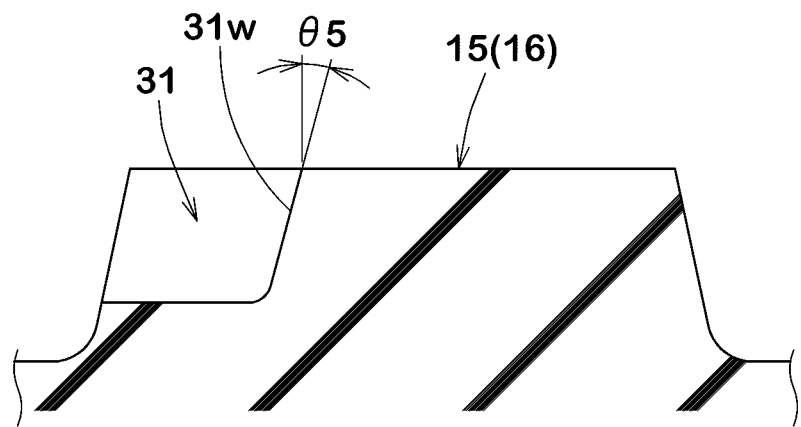
FIG. 5A and FIG. 5B are cross-sectional views taken along line B-B of FIG. 4 and line C-C of FIG. 4, respectively.
Figure 5B:
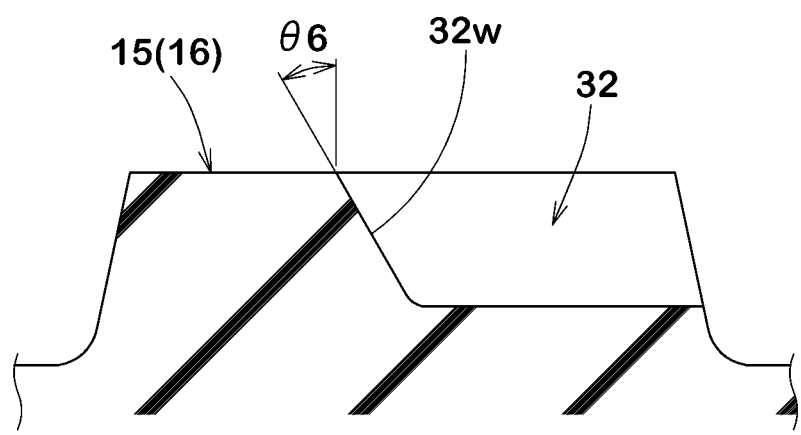

FIG. 5A illustrates a cross-sectional view of one of the first lateral grooves 31 taken along line B-B of FIG. 4. FIG. 5B illustrates a cross-sectional view of one of the second lateral grooves 33 taken along line C-C of FIG. 4. As illustrated in FIGS. 5A and 5B, it is preferable that an angle θ5 of a groove wall 31w of an axially inner end of the first lateral groove 31 is smaller than an angle θ6 of a groove wall 32w of an axially inner end of the second lateral groove 32. These angles θ5 and θ6 are angles with respect to the tire radial direction. This structure may be helpful to enlarge the angle θ1 of the conductive portion 23 further.

Figure 6:
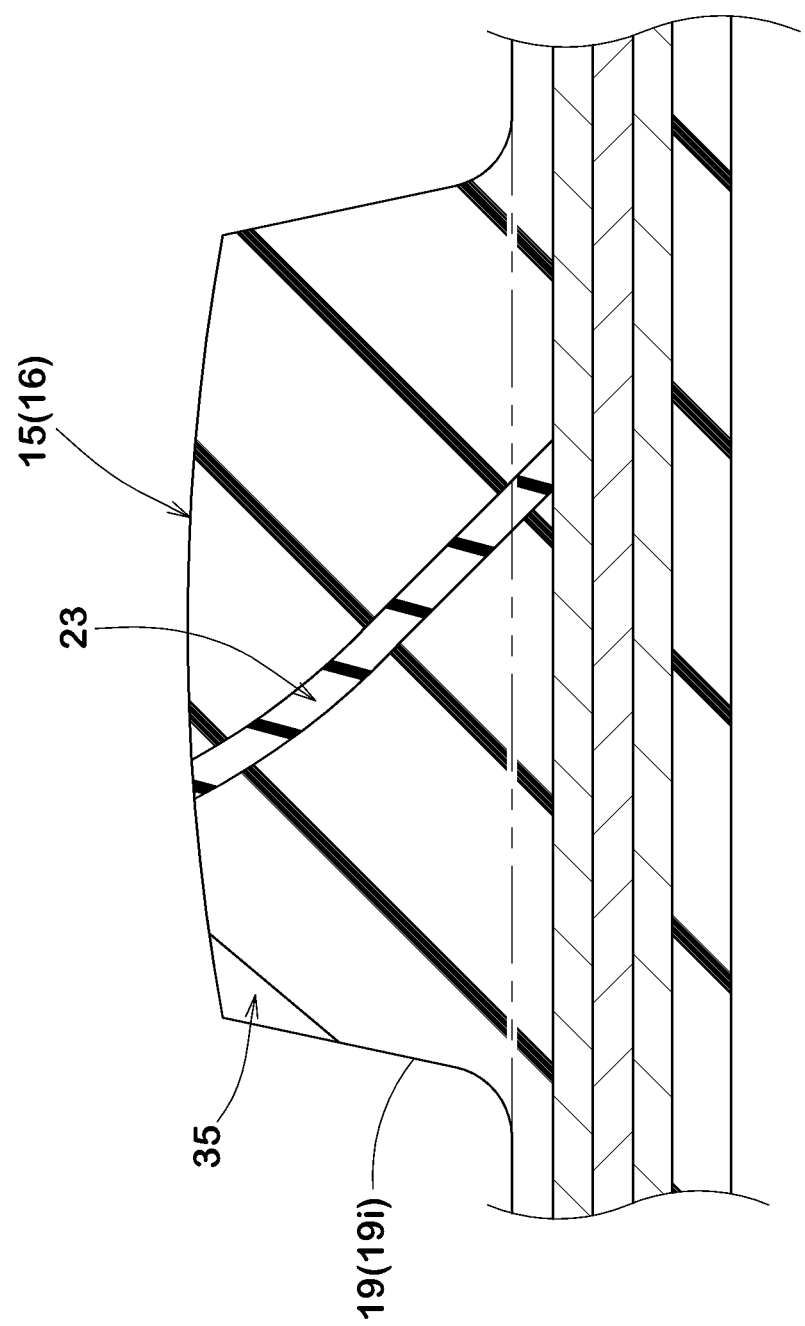
FIG. 6 is a cross-sectional view taken along line D-D of FIG. 2.

Preferably, the land portion 15 is provided with one or more chamfered portions 35. FIG. 6 illustrates an enlarged cross-sectional view of the land portion 15 with one chamfered portion 35. Note that FIG. 6 is a cross-sectional view taken along line D-D of FIG. 4. As illustrated in FIG. 6, the chamfered portion 35 is inclined at an angle which is greater than that of the remaining wall portion 19i of a side wall 19 of the land portion 15. The chamfered portion 35 may be helpful to suppress uneven wear of the land portion 15.

As illustrated in FIG. 4, one or more chamfered portions 35 are preferably provided on a corner of the land portion 15 on the side of the first edge 21. The chamfered portions 35 provided on the side of the first edge 21 suppress rubber flow of the raw tire toward the first edge 21 during vulcanizing the land portion 15, thereby resulting in keeping a sufficient distance between the first edge 21 and the outer end 25 of the conductive portion 23.

In this embodiment, one or more chamfered portions 35 are also provided on a corner of the land portion 15 on the side of the second edge 22. Thus, uneven wear of the land portion 15 may be suppressed further. Since the chamfered portions 35 on the side of the second edge 22 are located away from the outer end 25 of the conductive portion 23, it may not affect the above-mentioned rubber flow around the outer end 25 of the conductive portion 23.

In some preferred embodiments, one chamfered portion 35 and a non-chamfered portion 36 may be arranged in the tire circumferential direction between adjoining lateral grooves in the tire circumferential direction. Thus, since an area of the ground contact surface 20 of the land portion 15 can be sufficient, durability of the land portion and steering stability on dry road condition can be improved in a well-balanced manner while suppressing uneven wear of the land portion 15.

FIG. 7 illustrates an enlarged view of the land portion 15 in accordance with another embodiment of the disclosure. In FIG. 7, note that the same or common elements as the above embodiment are denoted with the same references. As illustrated in FIG. 7, the land portion 15 in accordance with the embodiment includes the ground contact surface 20 which includes a first profile 37 on a side of the first edge 21 and a second profile 38 on a side of the second edge 22. The first profile 37 has a radius Rb of curvature which is greater than that of the second profile 38. The land portion 15 as such, upon vulcanizing, may make rubber flow so as to move the outer end 25 of the conductive portion 23 toward the central position of the land portion 15 stronger.

In order to improve the above-mentioned effect while suppressing uneven wear of the land portion 15, the radius Rb of curvature of the first profile 37, for example, is preferably in a range of from 1.5 to 3.0 times a radius Rc of curvature of the second profile 38.

Next, a method for manufacturing a pneumatic tire as described above will be explained below. In this embodiment, the method includes: a step S1 of forming a raw tire; and a step S2 of vulcanizing the raw tire.

Figure 8A:
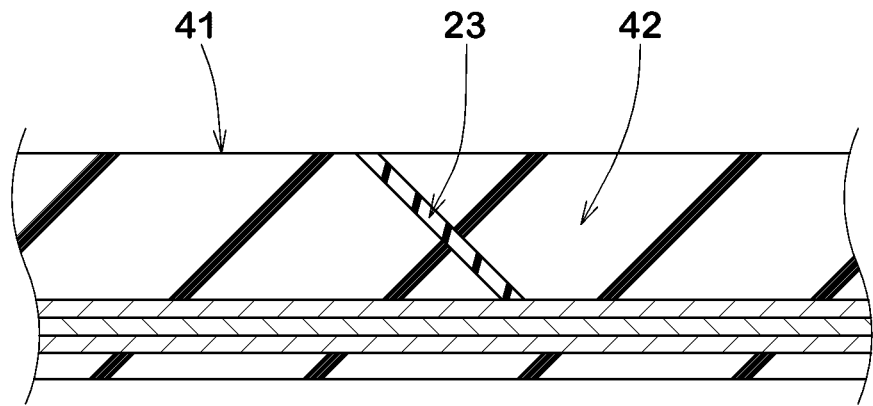
FIGS. 8A to 8C are partial cross-sectional views showing tread portions of raw tires as examples.
Figure 8B:
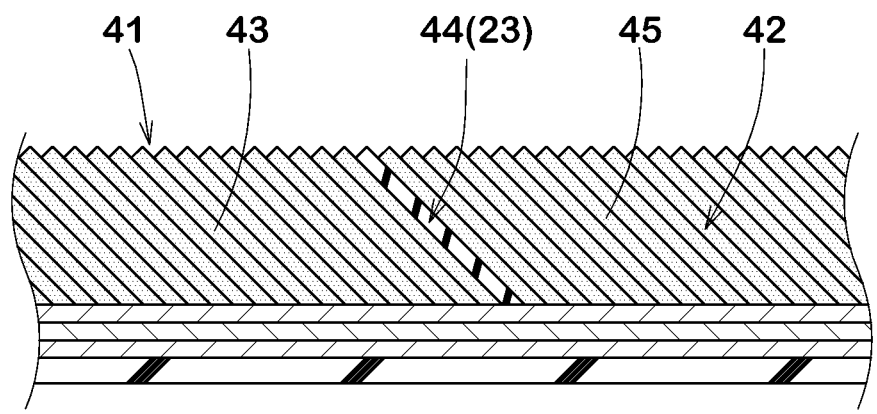
Figure 8C:
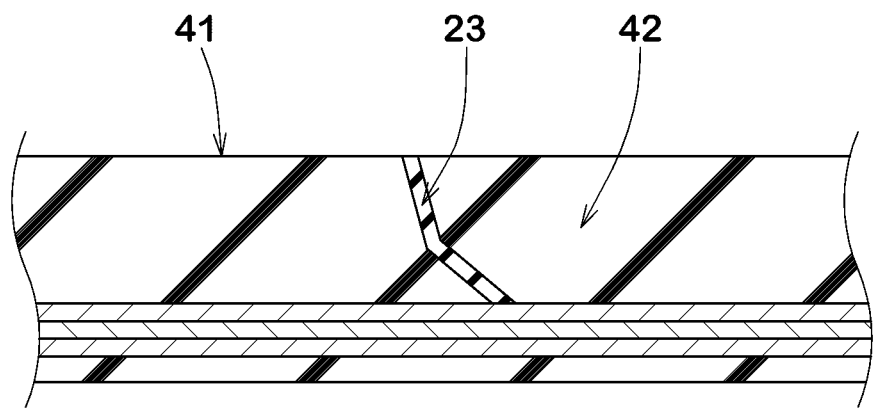

Raw Tire Forming Step S1:

FIGS. 8A to 8C illustrate partial cross-sectional views each showing a tread portion of a raw tire 41 as example. As illustrated in FIG. 8A, this step S1 forms the raw tire 41 which includes a tread portion 42 provided with a conductive portion 23 made of a conductive rubber. The conductive portion 23 are inclined with respect to the tire radial direction from a radially inner end to a radially outer end.

As illustrated in FIG. 8B, at least a part of the tread portion 42, for example, may be formed by being winding spirally a raw rubber strip. Preferably, a first strip 43 made of silica-rich non-conducting rubber compound may be wound, and then a second strip 44 made of conducting rubber compound may be wound to form the conductive portion 23, and then a third strip 45 made of silica-rich non-conducting rubber compound may be wound. Thus, a conductive portion 23 which extends continuously in the tire circumferential direction can be formed. The conductive portion 23 of the raw tire 41 extends with an inclination with respect to the tire radial direction from the radially inner end to the outer end which is exposed at an outer surface of the tread portion 42.

As illustrated in FIG. 8C, the conductive portion 23, for example, may be formed such that an angle with respect to the tire axial direction thereof increases gradually and/or stepwisely toward radially outwardly. The conductive portion 23 as such may exhibit better durability while increasing an adhere area to the other rubber of the tread portion 42.

Figure 9A:
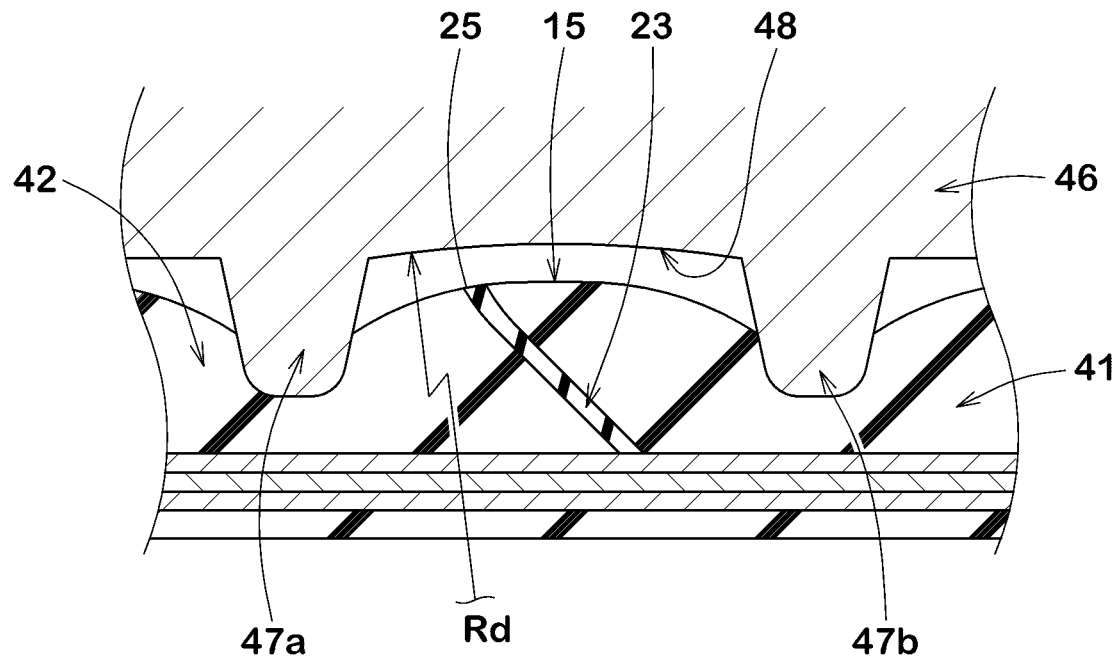
FIGS. 9A and 9B are enlarged cross-sectional views of a tread portion during vulcanizing.
Figure 9B:
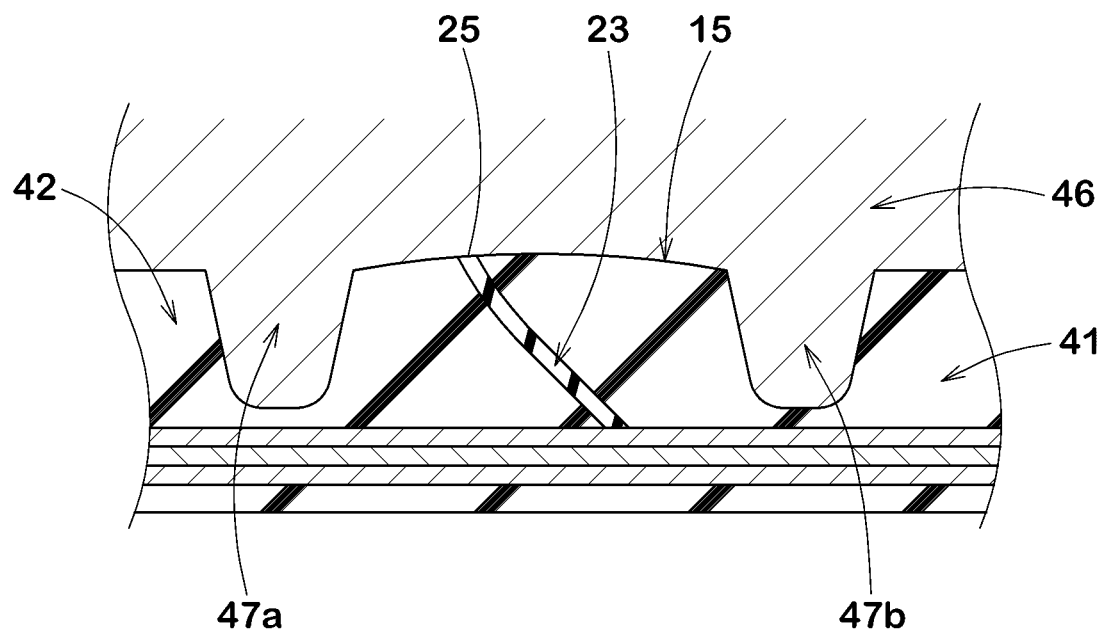

Vulcanizing Step S2:

FIGS. 9A and 9b illustrate enlarged cross-sectional views of the tread portion during vulcanizing. As illustrated in FIGS. 9A and 9B, this step S2 vulcanizes the raw tire 41 using a tire mold 46. The tire mold 46 includes a pair of protrusions 47a and 47b to mold a pair of main grooves and a land portion disposed therebetween on the tread portion 42. Upon vulcanizing process, the tire mold 46 is placed in the raw tire 41 such that the protrusions 47a and 47b form the land portion which includes the entire conductive portion 23. Thus, the raw tire is vulcanized to have the land portion 15 sectioned by the protrusions 47a and 47b.

The tire mold 46 also includes a ground contact surface molding face 48 for molding a ground contact surface of the land portion 15 between the pair of protrusions 47a and 47b. The ground contact surface molding face 48 is concave in an arc-shaped manner toward radially outwardly of the tire mold. Thus, in the vulcanizing step S2, the ground contact surface molding face 48 may be useful to generate plasticized rubber flow such that the outer end 25 of the conductive portion 23 approaches the axial center position of the land portion 15. The method as described above may keep an axial distance between an axial edge of the land portion 15 and the outer end 25 of the conductive portion 23 sufficiently due to the above-mentioned rubber flow, thereby resulting in suppressing separation to be generated from the outer end 25 of the conductive portion.

In order to improve the above effect further, a radius Rd of curvature of the ground contact surface molding face 48 is preferably in a range of from 350 to 750 mm, for example.

While the particularly preferable embodiments in accordance with the present disclosure have been described in detail, the present invention is not limited to the illustrated embodiments, but can be modified and carried out in various aspects.

EXAMPLE

Test tires 225/40R18 having the basic structure as illustrated in FIG. 1 were manufactured based on the details shown in Table 1. As a comparative example, a pneumatic tire having a crown land portion whose ground contact surface is flat, i.e. the radius of curvature being infinite, was also manufactured. Then, an electric resistance value of each tire and durability of the conductive portion of each tire was tested. The test procedures are as follows.

Figure 10:
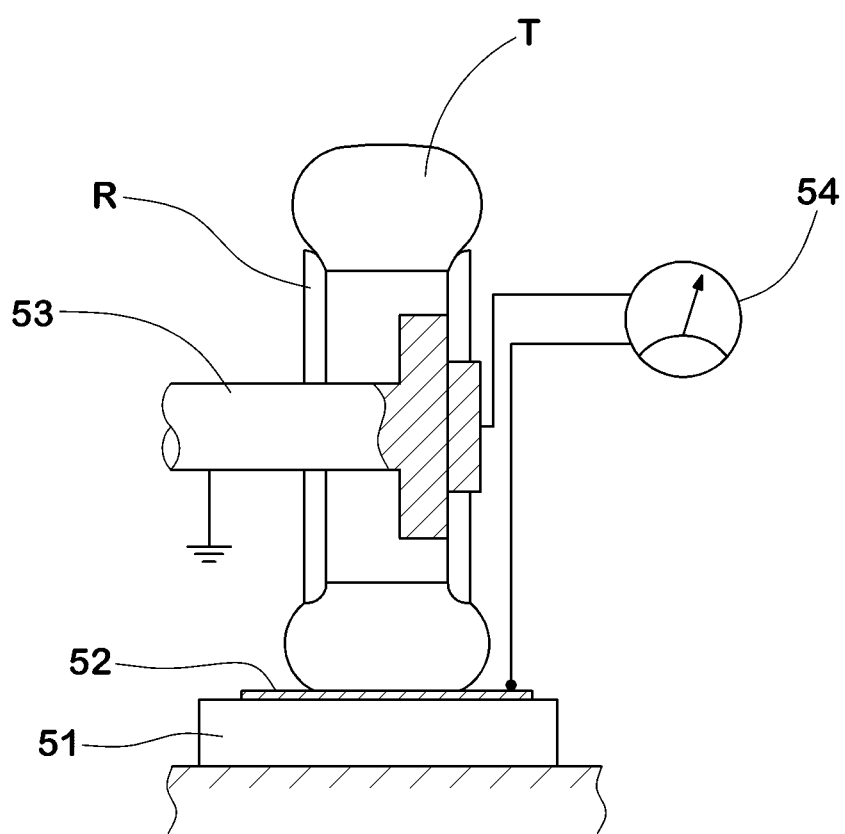
FIG. 10 is a diagram showing a method for measuring electric resistance value of a tire.

Electric Resistance Value Test:

Using a measurement device as illustrated in FIG. 10, the electric resistance of each tire T was measured according to the procedure specified by JATMA. Specifically, the electric resistance between an aluminum-alloy wheel rim R on which the tire T is mounted and a polished conductive metal board 52 having an electric resistance value equal to or less than 10 ohm on which the tire was put was measured with an ohm meter 54. The conductive metal board 52 is placed on an insulating board 51 with an electric resistance value of $10^{12}$ ohm. Note that each tire T was cleaned up to remove unwanted substances, e.g. mold release agent, dust and the like from the tire surface, and completely dried. The other conditions are as follows: rim size 18×8 J; inner pressure 200 kPa; vertical tire load 5.3 kN; atmospheric temperature 25 deg. C.; humidity 50%; applied voltage 1000 V; and measurable range of ohm meter $1.0 \times 10^3$ to $1.6 \times 10^{16}$ ohm.

The test detailed steps were conducted in the following order:
(1) The test tire T was mounted on a wheel rim R, using a small amount of soapy water between the bead bottom and bead seat as the lubricant;
(2) The tire was left in a test room for two hours, and then, the tire/rim assembly was attached to a tire mounted axis 53;
(3) The tire load was applied for 30 seconds and then released. Again, the tire load was applied for 30 seconds and released. Lastly, the tire load was applied for two minutes and released; and
(4) The applied voltage was 1000 V, and the stable value after five minutes lapsed from the application of the voltage was read. Such measurement was repeated totally four times per tire by rotating the tire at 90-degree steps. The highest value in the four measurements was employed as the electric resistance of the tire.

Durability Test for Conductive Portion:

Each test tire was made to run on a drum tester continuously with an inner pressure of 360 kPa and a vertical tire load of 4.21 kN, and a running distance of the tire until damage of the conductive portion occurs was measured. In the respective test tires, ten tires were tested, and average runnable distances were calculated. Test results are shown in table 1 using an index of the average runnable distances, wherein Ref. is set to 100. Note that the larger the value, the better the durability of the conductive portion is.

Table 1 shows the test results.

TABLE 1

|  | Ref. | Ex. 1 | Ex. 2 | Ex. 3 | Ex. 4 | Ex. 5 | Ex. 6 | Ex. 7 |
|---|---|---|---|---|---|---|---|---|
| Area ratio Sa/St (%) | 0 | 1.1 | 0.3 | 0.7 | 1.4 | 1.8 | 1.1 | 1.1 |
| Ratio h1/W1 (%) | 0 | 0.6 | 0.2 | 0.4 | 0.8 | 1 | 0.6 | 0.6 |
| Radius Ra of curvature of ground contact surface (mm) | ∞ | 500 | 1500 | 720 | 375 | 300 | 500 | 500 |
| Axial distance L1 (mm)/main groove depth d1 (mm) | 0.6 | 0.6 | 0.6 | 0.6 | 0.6 | 0.6 | 0.4 | 0.5 |
| Conductive portion angle θ1 (deg.) | 45 | 45 | 45 | 45 | 45 | 45 | 45 | 45 |
| Electric resistance value of tire (×$10^6$ ohm) | 2 | 2 | 2 | 2 | 2 | 2 | 2 | 2 |
| Durability of conductive portion (index) | 100 | 109 | 105 | 107 | 108 | 106 | 106 | 108 |

|  | Ex. 8 | Ex. 9 | Ex. 10 | Ex. 11 | Ex. 12 | Ex. 13 |
|---|---|---|---|---|---|---|
| Area ratio Sa/St (%) | 1.1 | 1.1 | 1.1 | 1.1 | 1.1 | 1.1 |
| Ratio h1/W1 (%) | 0.6 | 0.6 | 0.6 | 0.6 | 0.6 | 0.6 |
| Radius Ra of curvature of ground contact surface (mm) | 500 | 500 | 500 | 500 | 500 | 500 |
| Axial distance L1 (mm)/main groove depth d1 (mm) | 0.7 | 0.8 | 0.6 | 0.6 | 0.6 | 0.6 |
| Conductive portion angle θ1 (deg.) | 45 | 45 | 30 | 40 | 60 | 70 |
| Electric resistance value of tire (×$10^6$ ohm) | 2 | 2 | 2 | 2 | 2 | 2 |
| Durability of conductive portion (index) | 108 | 107 | 106 | 108 | 108 | 107 |

As shown in Table 1, it is confirmed that the example tires suppress separation of the conductive portions while maintaining low electric resistances of the tires.

What is claimed is:
1. A pneumatic tire comprising:
a tread portion comprising circumferentially and continuously extending main grooves and land portions divided by the main grooves;
in a cross-sectional view of the tire including a tire axis, one of the land portions comprising a first edge, a second edge, a ground contact surface extending between the first edge and the second edge and having an arc-shaped profile protruding radially outwardly, and conductive portion made of conductive rubber; and
the conductive portion extending from a radially inner end to a radially outer end exposed at the ground contact surface with an inclination toward the first edge, wherein:
the inner end is connected to a tire internal structural member to be electrically connected to a rim when the tire is mounted on the rim,
on the ground contact surface, a central position of the outer end is located on a central position of said one of the land portions in a tire axial direction, or on a side of the first edge with respect to the central position of one of the land portions,
a cross-sectional area (Sa) of the land portion defined between a straight line that connects the first edge and the second edge, and the arc-shaped profile of the ground contact surface is in a range of from 0.7% to 1.4% of a cross-sectional area (St) of the land portion,
said one of the land portions is provided with a first lateral groove extending from the first edge and terminating within said one of the land portions and a second lateral groove extending from the second edge and terminating within said one of the land portions, the first lateral groove has a groove void volume smaller than that of the second lateral groove, the first lateral groove and the second lateral groove have a first inner end and a second inner end, respectively, each terminating within said one of the land portions, and a groove wall of the first inner end in a cross-sectional view taken along a groove centerline thereof is inclined at a smaller angle with respect to a tire radial direction than an angle of a groove wall of the second inner end in a cross-sectional view taken along a groove centerline thereof.

2. The pneumatic tire according to claim 1, wherein
the ground contact surface has a radially maximum height (h1) from the straight line connecting the first edge and the second edge, and
the maximum height (h1) is in a range of from 0.4% to 0.8% of an axial width (W1) of the ground contact surface.

3. The pneumatic tire according to claim 1, wherein
the profile of the ground contact surface has a radius of curvature in a range of from 350 to 750 mm.

4. The pneumatic tire according to claim 1, wherein
an axial distance from the first edge to the outer end is in a range of from 0.40 to 0.80 times a depth of one of the main grooves which adjoins the first edge.

5. The pneumatic tire according to claim 1, wherein
the tire internal structural member comprises a belt layer disposed in the tread portion and extending along an outer surface of the tread portion, and
an acute angle between the conductive portion and the belt layer is smaller than an acute angle between the conductive portion and the ground contact surface.

6. The pneumatic tire according to claim 1, wherein
the conductive portion is inclined at an angle of from 40 to 60 degrees with respect to the ground contact surface.

7. The pneumatic tire according to claim 1, wherein
the profile of the ground contact surface comprises a first profile on a side of the first edge and a second profile on a side of the second edge, and
a radius of curvature of the first profile is greater than that of the second profile.

8. The pneumatic tire according to claim 1, wherein the tire internal structural member comprising a belt layer disposed in the tread portion and extending along an outer surface of the tread portion, an angle θ2 between the conductive portion and the belt layer is smaller than an angle θ1 between the conductive portion and the ground contact surface, and the angle θ2 is in a range of 30 to 50 degrees.

9. The pneumatic tire according to claim 1, wherein
the first lateral groove and the second lateral groove are inclined with respect to the tire axial direction, and
a maximum angle of the first lateral groove with respect to the tire axial direction is smaller than a maximum angle of the second lateral groove with respect to the tire axial direction.

10. The pneumatic tire according to claim 1, wherein
a maximum groove width of the first lateral groove is greater than a maximum groove width of the second lateral groove.

11. A method for manufacturing the pneumatic tire according to claim 1, the method comprising:

forming a raw tire comprising the tread portion provided with the conductive portion made of a conductive rubber, wherein the conductive portion of the raw tire extends radially outwardly to the outer end exposed at the ground contact surface of the tread portion with the inclination toward a first side in the tire axial direction;

vulcanizing the raw tire using a tire mold having the pair of protrusions for molding main grooves to mold the land portion of the tread portion between the pair of protrusions such that the land portion includes the conductive portion therein, wherein the tire mold comprises a ground contact surface molding face for molding the ground contact surface of the land portion between the pair of protrusions, and wherein the ground contact surface molding face is configured as an arc-shaped concave surface to produce rubber flow such that the outer end of the conductive portion, upon vulcanizing, is moved to a central side of the land portion in the tire axial direction; and forming on the land portion the first lateral groove extending from the first edge and terminating within the land portion and the second lateral groove extending from the second edge and terminating within the land portion, the groove void volume of the first lateral groove being smaller than that of the second lateral groove, wherein the first lateral groove and the second lateral groove have the first inner end and the second inner end, respectively, each terminating within the land portion, and wherein the groove wall of the first inner end in the cross-sectional view taken along the groove centerline thereof is inclined at a smaller angle with respect to the tire radial direction than the angle of the groove wall of the second inner end in the cross-sectional view taken along a groove centerline thereof.

12. The method according to claim 11, wherein
a radius of curvature of the ground contact surface molding face is in a range of from 350 to 750 mm.

* * * * *